Patented Oct. 3, 1939

2,174,591

UNITED STATES PATENT OFFICE 2,174,591

MANUFACTURE OF METAL-CONTAINING AZO DYESTUFFS

Mordecai Mendoza, Blackley, Manchester, England, assignor to Imperial Chemical Industries Limited, a corporation of Great Britain No Drawing. Application September 14, 1936, Serial No. 100,792. In Great Britain September 20, 1935

12 Claims. (Cl. 260—148)

The present invention relates to the manufacture of metal-containing azo dyestuffs.

The object of this invention is to obtain new metal-containing azo dyestuffs. A further object is to obtain new metal-containing azo dyestuffs which are particularly useful for dyeing leather. A further object is to obtain new metal-containing azo dyestuffs which will dye leather of all tannages. A further object is to obtain new metal-containing azo dyestuffs which, when used to dye leather, have good fastness to acids, alkalis and light and good fastness to washing. Further objects of this invention will be disclosed or apparent in the following description.

These objects are attained by treating the azo dyestuffs obtainable by coupling meta diamines of the benzene series having two free coupling positions with one molecular proportion of diazotised o-amino-p-sulfosalicylic acid $$(OH:COOH:SO_3H:NH_2; 1:2:4:6)$$

and one molecular proportion of a different diazotised amine with agents yielding metals having an atomic weight between 50 and 64.

As diazotised amines we may use, for example, amino-benzenes or naphthylamines or their carboxylic or sulfonic acids or we may use diazotised aminomonoazo compounds such as aminoazobenzene, aminoazobenzene sulfonic acid. As suitable amines may be mentioned sulphanilic acid, metanilic acid, m-aminobenzoic acid, aniline, p-toluidine, picramic acid and naphthionic acid.

As agents yielding metals I may use, for example, copper sulfate, ammoniacal cupric hydroxide, chromium fluoride, cobalt sulfate, nickel sulfate, ferrous sulfate or copper acetate. In general it is not necessary to isolate the metal-free parent dyestuffs from the aqueous coupling media in which they have been formed before treating with metal-yielding agents according to the invention, but it is preferable to make the said coupling media neutral to litmus before such treatment. If desired the metal-free parent dyestuff may be isolated and purified before treatment according to the invention.

The following examples, in which the parts are by weight, illustrate but do not limit the invention.

Example I 23.3 parts of o-amino-p-sulfosalicylic acid $(OH:COOH:SO_3H:NH_2=1:2:4:6)$ in 300 parts of water are diazotised at 15° C. by means of 30 parts of hydrochloric acid (36.5%) and 69 parts of a 10% aqueous solution of sodium nitrite. To the diazo solution so obtained there is added, with stirring, a solution of 10.8 parts of m-phenylenediamine in 200 parts of water. The coupling mixture, which is a bright orange suspension, is stirred for 12 hours. Sufficient caustic soda lye is then added to make the reaction faintly alkaline to litmus. The reaction mixture is cooled to below 10° C. by means of ice and the diazo suspension obtained in the usual way from 17.3 parts of sulfanilic acid is added, followed by a further addition of 30 parts of caustic soda lye (32%), in order to make the coupling mixture alkaline to litmus. The coupling mixture is stirred for 2 to 3 hours and then neutralised to litmus by addition of hydrochloric acid. A solution of 25 parts of crystalline copper sulfate in 100 parts of water is then added and the mixture is boiled under reflux condenser for 4 hours. The copper complex so formed is then isolated by salting out and filtering or by evaporating the total reaction liquor to dryness. When dried and ground it is a dark brown powder readily soluble in water. It yields very level reddish middle brown shades on leather of all tannages. The dyeings possess excellent fastness to light and very good fastness to washing.

Example II

The diazo compound from 17.3 parts of sulfanilic acid in Example 1 is replaced by the diazo compound obtained in the usual way from 19.9 parts of picramicacid. The copper complex of the resulting disazo combination is obtained by the method in Example 1. The new copper-containing dyestuff dyes leather in very level dark brown shades of very good fastness to light and washing.

Example III

The monoazo combination (o-amino-p-sulfosalicylic acid→m-phenylenediamine) of Example I is further coupled, under the conditions described for diazotised sulfanilic acid, to the diazo azo compound prepared in the customary manner from 32.7 parts of the monoazo combination obtained by coupling diazobenzene with 1-naphthylamine-6- or 1-naphthylamine-7-sulfonic acid (or the technical mixture of these acids). On completion of the second coupling the reaction is made neutral to litmus by addition of hydrochloric acid, a solution of 25 parts of crystalline copper sulfate in 100 parts of water is added and the mixture boiled under reflux condenser for 4 hours. The copper complex so obtained is precipitated by adding common salt, filtered, dried and ground.

It dyes leather in maroon shades, the dyeings being very level and possessing very good fastness to light and washing.

Example IV

A solution of 23.3 parts of o-amino-p-sulfosalicylic acid in 300 parts of water is diazotised by means of 30 parts of hydrochloric acid (36.5%) and 69 parts of a 10% aqueous solution of sodium nitrite. To the diazo solution there is added, with stirring, a solution of 12.2 parts of m-tolylenediamine in 200 parts of water. The coupling is stirred for 12 hours and then made faintly alkaline to litmus by addition of caustic soda lye. Sufficient ice is added to reduce the temperature to below 10° C. and the diazo suspension obtained from 22.3 parts of naphthionic acid is then stirred in. 30 parts of caustic soda lye (32%) are quickly added in order to make the coupling mixture alkaline to litmus. After stirring for 2 to 3 hours the coupling liquor is neutralised with hydrochloric acid, a solution of 25 parts of copper sulfate crystals in 100 parts of water is added and the mixture boiled under reflux condenser for 4 hours. The copper complex is precipitated by means of common salt, filtered off, dried and ground. It yields very level brown dyeings on leather of very good fastness to light and washing.

Example V

The monoazo combination o-amino-p-sulfosalicyclic acid→m-tolylenediamine prepared as in Example IV is further coupled to the diazo suspension obtainable from 30.9 parts of 4-amino-4'-nitrodiphenylamine-2'-sulfonic acid. The coupling mixture is then neutralized by means of hydrochloric acid and then boiled under reflux condenser for 4 hours with a solution of 25 parts of crystalline copper sulfate in 100 parts of water. The copper-containing dyestuff so-formed, when isolated by salting out and filtering, dyes leather in very level light brown shades of very good fastness to light and washing.

Example VI 53.6 parts of the parent disazo dyestuff o-amino-p-sulfosalicyclic acid→m-phenylenediamine←sulfanilic acid prepared according to the method of Example I, are dissolved in 800 parts of water and a solution of 18.1 parts of the tetra hydrate of chromium fluoride in 100 parts of water is added. The mixture is boiled under reflux condenser for 6 hours and then evaporated to dryness. The chromium complex so obtained dyes leather in very level dull tan shades of very good light and wash fastness.

By substituting 28.1 parts of nickel sulfate crystals ($NiSO_4 7H_2O$) for the chromium fluoride used in the above example, a nickel-containing dyestuff is formed which yields very level nut-brown shades on leather of similar very good fastness properties.

In a similar manner, but using 28.1 parts of cobalt sulfate crystals ($CoSO_4 7H_2O$) in place of the chromium fluoride in the above example, a cobalt-containing dyestuff is obtained, which dyes leather in very level nigger-brown shades of very good fastness to light and washing.

By using 27.8 parts of crystalline ferrous sulfate in place of the chromium fluoride in the above example, there is obtained an iron-containing dyestuff which yields very level middle tan shades on leather of similar good properties of fastness.

As many apparently widely different embodiments of this invention may be made without departing from the spirit and scope thereof, it is to be understood that I do not limit myself to the specific embodiments thereof except as defined in the appended claims.

I claim:

1. As new products the metal complexes of azo dyestuffs represented by the formula

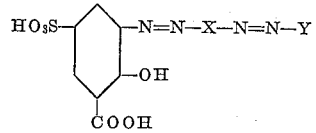

in which X is the residue of an arylene diamine of the benzene series having two coupling positions and in which two amino groups are in meta positions to each other; and Y is the residue of a primary aryl amine other than the residue of ortho coupled p-sulfo salicyclic acid, said primary aryl amine being of the group consisting of aniline, mono-amino naphthalene, naphthylamine mono-sulfonic acids, benzene-azo-naphthylamine mono-sulfonic acids and amino benzenes substituted by at least one of the group consisting of nitro, hydroxy, alkyl, sulfonic acid, carboxyl, azo-benzene, azo-benzene sulfonic acid and —NH benzene sulfonic acid, said metal having an atomic weight between 50 and 64.

2. As new products the metal complexes of azo dyestuffs represented by the formula

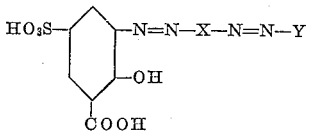

in which X is the residue of an arylene diamine of the benzene series having two coupling positions and in which two amino groups are in meta positions to each other; and Y is the residue of a primary aryl amine other than the residue of ortho coupled p-sulfo salicyclic acid, said primary aryl amine being of the group consisting of aniline, mono-amino naphthalene, naphthylamine mono-sulfonic acids, benzene-azo-naphthylamine mono-sulfonic acids and amino-benzenes substituted by at least one of the group consisting of nitro-hydroxy, alkyl, sulfonic acid, carboxyl, azo-benzene, azo-benzene sulfonic acid and —NH benzene sulfonic acid, said metal being copper.

3. As new products the metal complexes of azo dyestuffs represented by the formula

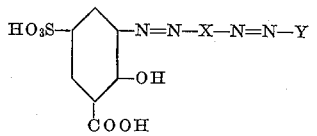

in which X is the residue of an arylene diamine of the benzene series having two coupling positions and in which two amino groups are in meta positions to each other; and Y is the residue of a primary aryl amine other than the residue of ortho coupled p-sulfo salicyclic acid, said primary aryl amine being of the group consisting of aniline, mono-amino naphthalene, naphthylamine mono-sulfonic acids, benzene-azo-naphthylamine mono-sulfonic acids and amino benzenes substituted by at least one of the group consisting of nitro, hydroxy, alkyl, sulfonic acid, carboxyl, azo-benzene, azo-benzene sulfonic acid and —NH benzene sulfonic acid, said metal being chromium.

4. As a new product the copper complex of the azo dye which has the formula

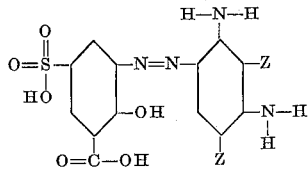

where one Z is the group

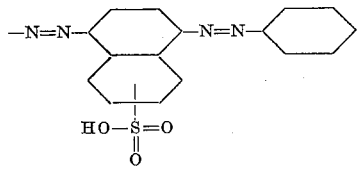

in which the sulfonic acid group is in the -6(7)-position, and the other Z is hydrogen.

5. As a new product the copper complex of the azo dye which has the formula

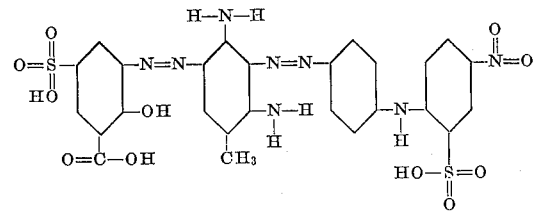

6. As a new product the chromium complex of the azo dyestuffs which has the formula

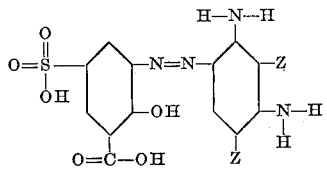

where one Z is the group

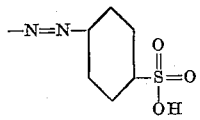

and the other group is hydrogen.

7. A process for the manufacture of metal-containing dyestuffs which comprises treating with agents yielding metals having an atomic weight between 50 and 64, those unsymmetrical azo dyestuffs obtainable by coupling meta diamines of the benzene series having two free coupling positions with one molecular proportion of diazotized o-amino-p-sulfosalicylic acid (OH:COOH:SO$_3$H:NH$_2$;1:2:4:6) and one molecular proportion of a diazotized primary aryl amine other than the residue of ortho-coupled para-sulfo salicylic acid; said primary aryl amine being one of a group consisting of aniline, mono-amino naphthalene, naphthylamine mono-sulfonic acids, benzene-azo-naphthylamine mono-sulfonic acids and amino benzenes substituted by at least one of the group consisting of nitro-hydroxy, alkyl, sulfonic acid, carboxyl, azo-benzene, azo-benzene sulfonic acid and —NH benzene sulfonic acid.

8. A process for the manufacture of metal-containing dyestuffs which comprises treating with an agent yielding copper, those unsymmetrical azo dyestuffs obtainable by coupling meta diamines of the benzene series having two free coupling positions with one molecular proportion of diazotized o-amino-p-sulfosalicylic acid (OH:COOH:SO$_3$H:NH$_2$;1:2:4:6) and one molecular proportion of a diazotized primary aryl amine other than the residue of ortho-coupled para-sulfo salicylic acid: said primary aryl amine being one of a group consisting of aniline, mono-amino naphthalene, naphthylamine mono-sulfonic acids, benzene-azo-naphthylamine mono-sulfonic acids and amino benzenes substituted by at least one of the group consisting of nitro, hydroxy, alkyl, sulfonic acid, carboxyl, azo-benzene, azo-benzene sulfonic acid and —NH benzene sulfonic acid.

9. A process for the manufacture of metal-containing dyestuffs which comprises treating with an agent yielding chromium, those unsymmetrical azo dyestuffs obtainable by coupling meta diamines of the benzene series having two free coupling positions with one molecular proportion of diazotized o-amino-p-sulfosalicylic acid (OH:COOH:SO$_3$H;NH$_2$;1:2:4:6) and one molecular proportion of a diazotized primary aryl amine other than the residue of ortho-coupled para-sulfo salicylic acid; said primary aryl amine being one of a group consisting of aniline, mono-amino naphthalene, naphthylamine mono-sulfonic acids, benzene-azonaphthylamine mono-sulfonic acids and amino benzenes substituted by at least one of the group consisting of nitro, hydroxy, alkyl, sulfonic acid, carboxyl, azo-benzene, azo-benzene sulfonic acid and —NH benzene sulfonic acid.

10. A process for the manufacture of metal-containing dyestuffs which comprises treating with an agent yielding copper the azo dyestuff obtained by coupling m-phenylene diamine with one molecular proportion of diazotized o-amino-p-sulfosalicylic acid (OH:COOH:SO$_3$H:NH$_2$;-1:2:4:6) and one molecular proportion of the diazotized monoazo combination obtained by coupling diazo benzene with a 1-naphthylamine-6(7)-sulfonic acid.

11. A process for the manufacture of metal-containing dyestuffs which comprises treating with an agent yielding copper the azo dyestuff obtained by coupling m-tolylene diamine with one molecular proportion of diazotized o-amino-p-sulfosalicylic acid (OH:COOH:SO$_3$H:NH$_2$;-1:2:4:6) and one molecular proportion of diazotized 4-amino-4'-nitrodiphenylamine-2'-sulfonic acid.

12. A process for the manufacture of metal-containing dyestuffs which comprises treating with an agent yielding chromium the azo dyestuff obtained by coupling m-phenylene diamine with one molecular proportion of diazotized o-amino-p-sulfo-salicylic acid (OH:COOH:SO$_3$H:-NH$_2$;1:2:4:6) and one molecular proportion of diazotized sulfanilic acid.

MORDECAI MENDOZA.